(12) United States Patent
Simon et al.

(10) Patent No.: US 12,509,012 B2
(45) Date of Patent: Dec. 30, 2025

(54) METHOD FOR DETECTING AND EVALUATING AN ACCIDENT OF A VEHICLE

(71) Applicant: Sfara, Inc., Hoboken, NJ (US)

(72) Inventors: Sascha Simon, Warwick, NJ (US); Ali Ghomashchi, Brooklyn, NY (US); Jonathan Guez, Bala Cynwyd, PA (US)

(73) Assignee: SFARA INC., Hoboken, NJ (US)

( * ) Notice: Subject to any disclaimer, the term of this patent is extended or adjusted under 35 U.S.C. 154(b) by 18 days.

(21) Appl. No.: 18/655,764

(22) Filed: May 6, 2024

(65) Prior Publication Data

US 2024/0286568 A1    Aug. 29, 2024

Related U.S. Application Data (63) Continuation of application No. PCT/US2022/051065, filed on Nov. 28, 2022.
(Continued)

(51) Int. Cl.
*B60R 21/0132* (2006.01)
*G08B 21/10* (2006.01)
(Continued)

(52) U.S. Cl.
CPC .......... *B60R 21/0132* (2013.01); *G08B 21/10* (2013.01); *G08B 25/10* (2013.01); *H04W 4/40* (2018.02); *H04W 4/90* (2018.02)

(58) Field of Classification Search
CPC .... B60R 21/0132; G08B 21/10; G08B 25/10; G08B 21/02; H04W 4/90; H04W 4/40
See application file for complete search history.

(56) References Cited

U.S. PATENT DOCUMENTS

| | | | |
|---|---|---|---|
| 8,290,480 B2 | 10/2012 | Abramson et al. | |
| 8,509,812 B2 | 8/2013 | Fong et al. | |

(Continued)

FOREIGN PATENT DOCUMENTS

| | | |
|---|---|---|
| DE | 102005021115 A1 | 11/2006 |
| WO | 2018147881 A1 | 8/2018 |

OTHER PUBLICATIONS

Fleming, Overview of Automotive Sensors, IEEE Sensors Journal, vol. 1, No. 4, Dec. 2001.

(Continued)

*Primary Examiner* — John A Tweel, Jr.
(74) *Attorney, Agent, or Firm* — Christopher J. Volkmann; KELLY, HOLT & CHRISTENSON PLLC (57) ABSTRACT

A method for detecting and rating an accident involving a vehicle, the method steps being executed on a mobile device equipped with at least two sensors that is carried by the vehicle. A accident monitoring system is operated on the mobile device in such a way that the mobile device continually captures sensor data of at least two of its sensors and temporarily stores said data in a memory in the manner of a shift register and that, after the sensor data of at least one of the sensors have exceeded a threshold value stipulated for the respective sensor, a timestamp is set in the memory, the available sensor data remain stored and an accident verification routine is launched on the mobile device. The accident verification routine both evaluates the stored sensor data in such a way that a tiered significance level (severity level) is ascertained and evaluates the sensor data captured from the timestamp onwards in a time interval of predetermined length in such a way that a tiered credibility level (confidence level) is repeatedly ascertained, that the significance level (severity level) and/or the currently ascertained credibility level (confidence level) are repeatedly used in the time interval to decide either that an accident report is sent (Continued)

or that no accident report is sent and the accident verification routine is executed again or that the accident verification routine is terminated.

19 Claims, 7 Drawing Sheets

Related U.S. Application Data (60) Provisional application No. 63/310,567, filed on Feb. 15, 2022, provisional application No. 63/283,935, filed on Nov. 29, 2021.

(51) Int. Cl.
*G08B 25/10* (2006.01)
*H04W 4/40* (2018.01)
*H04W 4/90* (2018.01)

(56) References Cited

U.S. PATENT DOCUMENTS

| | | | |
|---|---|---|---|
| 8,520,695 B1* | 8/2013 | Rubin | H04W 72/30 370/445 |
| 8,969,952 B2 | 3/2015 | Simon | |
| 9,037,407 B2 | 5/2015 | Thompson | |
| 9,311,271 B2 | 4/2016 | Wright | |
| 9,333,946 B2 | 5/2016 | Simon | |
| 9,390,625 B2 | 7/2016 | Green et al. | |
| 9,758,120 B2 | 9/2017 | Alamanos | |
| 10,165,429 B1* | 12/2018 | Young | H04W 4/90 |
| 10,832,504 B1 | 11/2020 | Bellas et al. | |
| 11,162,800 B1* | 11/2021 | Carbery | G01C 21/28 |
| 11,562,436 B2* | 1/2023 | Seth | G06Q 40/08 |
| 2015/0084757 A1 | 3/2015 | Annibale et al. | |
| 2016/0323741 A1 | 11/2016 | Lee et al. | |
| 2019/0261069 A1 | 8/2019 | Balakrishnan et al. | |
| 2019/0354838 A1 | 11/2019 | Zhang et al. | |
| 2020/0005648 A1 | 1/2020 | Yang | |
| 2020/0037133 A1 | 1/2020 | Kusumoto et al. | |
| 2020/0242856 A1 | 7/2020 | Schmitt et al. | |
| 2025/0097299 A1* | 3/2025 | Yoganathan | G06Q 50/40 |

OTHER PUBLICATIONS

Halgamuge et al, Measurement and Analysis of Electromagnetic Fields From Trams, Trains, and Hybrid Cars, Radiation Protection Dosimetry (2010), vol. 141, No. 3, DOI:10.1093.

Ahn et al, Low Frequency, Electromagnetic Field Reduction Techniques for the On-Line Electric Vehicle (OLEV), 2010 IEEE International Symposium on Electromagnetic Compatibility, Fort Lauderdale, FL, USA, 2010, pp. 625-630, doi: 10.1109/ISEMC.2010.5711349.

Fazeen et al, Safe Driving Using Mobile Phones, IEEE Transactions on Intelligent Transportation Systems (vol. 13, Issue: 3, Sep. 2012).

Mohan et al, TrafficSense: Rich Monitoring of Road and Traffic Conditions using Mobile Smartphones. Microsoft Research, Apr. 2008.

Vukajlovic et al, The Practical Design of In-vehicle Telematics Device with GPS and MEMS Accelerometers, Telfor Journal, vol. 4, No. 2, 2012.

Yilin Zhao, Telematics: Safe and Fun Driving. IEEE Intelligent Systems 2002.

Cook et al, Control, computing and communications: technologies for the twenty-first century model T, Proceedings of the IEEE. vol. 95, Issue: 2, Feb. 2007.

Ching-Yao Chan. A treatise on crash sensing for automotive air bag systems, IEFE/ASME Transactions on Mechatronics, vol. 7, Issue. 2, Jun. 2002.

Shaout et al, Automotive airbag technology, past, present and future, International Journal of Computer Applications in Technology vol. 13, No. 3-5. Jan. 1, 2000.

Cech et al, Active Magnetic Field Based Sensing System for Improved Detection and Discrimination of Side Impact Crashes, Proceedings—19th International Technical Conference on the Enhanced Safety of Vehicles (ESV), Washington, D.C., Jun. 6-9, 2005, Paper No. 05-0406.

Bell, Policy issues for the future intelligent road transport infrastructure, IEE Proceedings—Intelligent Transport Systems, vol. 153, Issue 2, Jun. 2006, p. 147-155.

Hull et al, CarTel: a distributed mobile sensor computing system. SenSys '06: Proceedings of the 4th international conference on Embedded networked sensor systems, Oct. 2006. p. 125-138. https://doi.org/10.1145/1182807.1182821.

Dai et al, Mobile phone based drunk driving detection. 2010 4th International Conference on Pervasive Computing Technologies for Healthcare, IEEE, Jun. 2010, DOI: 10.4108/ICST.PervasiveHealth2010.8901.

Thompson et al, Using Smartphones to Detect Car Accidents and Provide Situational Awareness to Emergency Responders. In: Cai, Y., Magedanz. T., Li, M., Xia, J., Giannelli, C. (eds) Mobile Wireless Middleware, Operating Systems, and Applications. Mobilware 2010. Lecture Notes of the Institute for Computer Sciences, Social Informatics and Telecommunications Engineering, vol. 48. Springer, Berlin, Heidelberg. https://doi.org/10.1007/978-3-642-17758-3_3 ("Thompson 2010").

Johnson et al, Driving Style Recognition Using a Smartphone as a Sensor Platform, 2011 14th International IEEE Conference on Intelligent Transportation Systems (ITSC), IEEE, Nov. 2011, DOI: 10.1109/ITSC.2011.6083078.

Mednis et al, Real time pothole detection using Android smartphones with accelerometers. 2011 International Conference on Distributed Computing in Sensor Systems and Workshops (DCOSS), IEEE, Aug. 2011. DOI: 10:1109/DCOSS.2011.5982206.

Eren et al, Estimating driving behavior by a smartphone, 2012 IEEE Intelligent Vehicles Symposium, IEEE, Jul. 2012, DOI: 10.1109/IVS.2012.6232298.

Flemirig, Overview of Automotive Sensors, IEEE Sensors Journal, vol. 1, No. 4, Dec. 2001.

Petition for Inter Partes Review (IPR2024-00952) of U.S. Pat. No. 8,989,952 dated Jun. 5, 2024, 113 pages.

Petition for Inter Partes Review (IPR2024-00966) of U.S. Pat. No. 9,333,946 dated Jun. 6, 2024, 116 pages.

Extended European Search Report for European Application No. 22154548.6, dated Jul. 29, 2022, 11 Pages.

International Preliminary Report on Patentability for International Application No. PCT/US2022/051065, dated Jun. 13, 2024, 8 Pages.

International Search Report Written Opinion for PCT Application No. PCT/US2022/051065, dated Apr. 20, 2023, 12 pages.

\* cited by examiner

METHOD FOR DETECTING AND EVALUATING AN ACCIDENT OF A VEHICLE

CROSS-REFERENCES TO RELATED APPLICATIONS

The present application is a U.S. Bypass Continuation of and claims priority of PCT/US2022/051065 filed Nov. 28, 2022, which claims priority to U.S. provisional application 63/283,935, filed Nov. 29, 2021 and to U.S. provisional application 63/310,567, filed Feb. 15, 2022, the contents of which are each hereby incorporated by reference in their entirety.

DETAILED DESCRIPTION

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

Aspects of the present disclosure relate to a method for detecting and rating an accident involving a vehicle.

DE 10 2005 021 115 A1 discloses a method for triggering a vehicle emergency call. Said triggering comprises the steps of:

a trigger signal being delivered to an emergency control unit by an on-vehicle emergency sensor, an emergency signal being transmitted by the emergency control unit by way of a short-range communication, the emergency signal being received by a mobile phone by way of the short-range communication, and the vehicle emergency call being transmitted to an external control room by the mobile phone by way of mobile radio communication, and the mobile phone, which is embodied as a portable mobile phone designed to receive the short-range communication, being taken into the vehicle by a vehicle occupant, in particular the vehicle driver, before the vehicle emergency call is triggered. Such a method is unreliable because setup of the short-range connection is often forgotten if the mobile phone is not ready for short-range connections as standard.

It is an object of the present disclosure to propose a method for detecting and rating an accident involving a vehicle that can be executed on a mobile device independently of the vehicle and has a high level of reliability as regards a decision about the occurrence or nonoccurrence of an accident.

This object is achieved, for example, by characterizing features discussed below. The present disclosure specify advantageous and expedient developments.

The method according to one example for detecting and rating an accident involving a vehicle, the method steps of which method are executed on a mobile device equipped with at least two sensors that is carried by the vehicle, provides for the following:

an accident monitoring system is operated on the mobile device in such a way that the mobile device continually captures sensor data of at least two of its sensors and temporarily stores said data in a memory in the manner of a shift register and after the sensor data of at least one of the sensors have exceeded a threshold value stipulated for the respective sensor, a timestamp is set in the memory, the available sensor data remain stored and an accident verification routine is launched on the mobile device, wherein the accident verification routine both evaluates the stored sensor data in such a way that a tiered significance level (severity level) is ascertained and evaluates the sensor data captured from the timestamp onwards in a time interval of predetermined length in such a way that a tiered credibility level (confidence level) is repeatedly ascertained, that the significance level (severity level) and/or the currently ascertained credibility level (confidence level) are repeatedly used in the time interval to decide either that an accident report is sent or that no accident report is sent and the accident verification routine is executed again or that the accident verification routine is terminated.

The tiered system operated using such a method, which system involves a presumption, triggered by the exceeding of a threshold value stipulated for a sensor, of an accident having occurred being later verified in a sophisticated manner, is capable of deciding about the occurrence or nonoccurrence of a presumed accident with a high level of reliability. This allows incorrect accident reports and incorrect accident warnings to be reliably avoided. Such a method can therefore be used to keep down the number of incorrect accident reports and incorrect accident warnings, and to effectively counteract other threats of overload for control centers, despite an increasing prevalence of automatic accident reporting systems.

The method also provides for the accident report to be transmitted from the same mobile device as that on which the method is also executed. This increases reliability further, since performance takes place entirely on one mobile device, which means that the method can be hampered neither by a defect of a second device nor by interference on a connection to the second device.

Furthermore, there is provision for the mobile device to be used to capture and evaluate movement data and/or position data as sensor data in the time interval, this being performed in particular by means of a motion sensor of the mobile device and/or an acceleration sensor of the mobile device and/or a navigation sensor of the mobile device (e.g. GPS, inter alia). On the basis of movement data and/or position data, it is possible to sense movements of the user of the mobile device and/or movements of the vehicle, in the time interval, that allow conclusions to be drawn as to what is actually happening.

There is also provision for the credibility level (confidence level) to be ascertained by also using captured event data in addition to the captured sensor data. The evaluation of different data allows what is actually occurring to be detected more extensively and hence also more reliably.

Furthermore, there is provision for the accident verification routine to be used to also verify whether or not the measured velocity of the mobile device decreases, wherein if the velocity measured by the mobile device decreases to a value that in particular is below approximately 10 km/h and preferably is 0 km/h, the significance level (severity level) is set to a high value, which is indicative of an accident having occurred. In this way, e.g. the vehicle coasting to a stop following a collision and the vehicle being at a standstill as a result of an accident are reliably detected.

There is also provision for the evaluation to also involve a comparison of the sensor data and/or the event data with comparison data being performed, wherein the comparison data used are statistical data that in particular have been ascertained on the basis of analyzed and verified accidents and/or wherein the comparison data used are geodata derived from a map that are taken as a basis for rating a position or direction of movement of the mobile device. Such a comparison of the captured sensor data and/or the captured event data allows further insights indicative of or disputing an accident having occurred to be collected, which increase the reliability of a decision about the occurrence or nonoccurrence of an accident further.

Furthermore, there is also provision for the accident verification routine to be used to use comparison data to also verify whether the measured velocity of the mobile device increases to a value that is plausible for the movement of an undamaged vehicle, such an increase resulting in the credibility level (confidence level) being set to a low reference value, which is indicative of no accident having occurred. Such a comparison allows the reliability of a decision about the occurrence or nonoccurrence of an accident to be increased further.

There is also provision for the sensor data captured to be 3D movement data and/or acceleration data, which preferably have a unique association with the movement in space. Such sensor data can be taken as a basis for detecting e.g. untypical transverse accelerations and overturns.

Furthermore, there is provision for an accident warning to be transmitted after the accident report is sent, wherein the accident warning comprises at least one of the pieces of information cited below: a timestamp, geocoordinates of an accident location, a timestamp for the accident, a velocity measured by the navigation system. This allows other road users to be informed reliably and promptly.

To generate the information mentioned in the accident warning, there is provision for the timestamp and the sensor data to be used. This allows the accident report to be provided on the basis of available data, which means that no additional computing time is required.

Furthermore, there is provision for ascertainment of the significance level (severity level) to be started after a time delay following the launch of the accident verification routine and for the ascertainment of the significance level (severity level) to result in a trend in the velocity since the timestamp was set being taken into consideration to the effect that an increased significance level (severity level) is stipulated in the event of a deceleration to a velocity below a limit value or in the event of a standstill and a decreased significance level (severity level) is stipulated in the event of the absence of a deceleration. Such a comparison allows the reliability of a decision about the occurrence or nonoccurrence of an accident to be increased further.

There is also provision for the credibility level (confidence level) to be ascertained from the sensor data and the event data by also drawing conclusions about a behavior relating to a driver or passenger handling the mobile device and by evaluating the detected behavior in such a way that the credibility level (confidence level) is increased by a behavior that is typical of an accident and that the credibility level (confidence level) is reduced by a behavior that is untypical of an accident. Such a comparison allows the reliability of a decision about the occurrence or nonoccurrence of an accident to be increased further.

Furthermore, there is provision for an accident report to be sent whenever the significance level (severity level) has reached its highest reference value and for an accident report to also be sent whenever both the significance level (severity level) and the credibility level (confidence level) have reached predefined reference values. This ensures that the accident verification routine does not cause any unnecessary delay for accident report.

There is also provision for no accident report to be sent and for the accident verification routine to be executed again if the significance level (severity level) and the credibility level (confidence level) are at reference values that are neither provided for sending an accident report nor provided for terminating the accident verification routine. This reliably prevents an incorrect accident report from being sent.

Finally, there is provision for the accident verification routine to be terminated either if the time interval has expired or if the significance level (severity level) and/or the credibility level (confidence level) are so low that an accident can be ruled out. This reliably prevents an evaluation of sensor data or event data that is too far away in time from the presumption of an accident from leading to incorrect rating of the presumption of an accident.

Within the context of examples of the present disclosure, sensor data are understood to mean data that are captured by sensors of the mobile device, in particular during operation of the accident monitoring system as an application. Such sensor data comprise in particular velocity, preferably including the direction of the velocity, and/or G force, preferably including the direction of the G force, based on individual times and in particular a period of time before the accident and a period of time after the accident.

Within the context of examples of the present disclosure, event data are understood to mean data that relate to the use of applications of the mobile device and are related to the use of the applications by a user of the mobile device. Such event data can e.g. log one or more of the events cited below, such as "address book was searched", "telephone number was dialed", "telephone call was conducted", "digital image was taken", "video was recorded", "message was written", "emergency number was dialed", "computer game was played", etc.

Within the context of examples of the present disclosure, the credibility level (confidence level) is a tiered reference value for a likelihood of the "presumed accident" being an actual accident. The credibility level (confidence level) is ascertained on the basis of sensor data captured before, during and after the presumed accident and in particular additionally also on the basis of event data captured before, during and after the presumed accident. The credibility level (confidence level) can also be referred to as "crash likelihood". A high reference value is indicative of a high likelihood of an accident having occurred. A low reference value is indicative of a low likelihood of an accident having occurred.

Within the context of examples of the present disclosure, the significance level (severity level) is a tiered reference value for a likelihood of the "presumed accident" being able to be rated as an accident on the basis of the sensor data. A high reference value is indicative of a high likelihood of an accident having occurred. A low reference value is indicative of a low likelihood of an accident having occurred.

Within the context of examples of the present disclosure, comparison data are understood to mean empirically ascertained data, these being in particular stored empirical data and/or pattern data and/or measurement data that typically characterize modes of behavior of a user of a mobile device, who is in particular the driver of the vehicle or the passenger of the vehicle, or of a vehicle in which the mobile device is located.

Within the context of examples of the present disclosure, carriage of the mobile device by the vehicle is understood to mean at least one of the types of carriage described below:
 carriage of the mobile device in such a way that the mobile device is carried in the vehicle, in particular an automobile, in particular in a passenger compartment or a trunk of the vehicle and is in particular kept or stowed there;
 carriage of the mobile device in such a way that the mobile device is carried on a vehicle, in particular a two-wheeled vehicle, in particular in a storage compartment or on a bracket;
 carriage of the mobile device in such a way that the mobile device is carried by a driver of the vehicle;
 carriage of the mobile device in such a way that the mobile device is carried by a passenger of the vehicle.

Carriage of a mobile device of a vehicle is understood within the context of examples of the present disclosure to mean either the case in which the mobile device is located in or on the vehicle independently of a driver or passenger or the case in which the mobile device is held by the driver or passenger or the case in which the mobile device is located in a pocket of the clothing of the driver or passenger.

Further details of examples are described below on the basis of three exemplary embodiments. Of these,
 the first exemplary embodiment describes a first sequence of the method, which is typical of the case in which a presumption of an accident is incorrect;
 the second exemplary embodiment describes a second sequence of the method, which is typical of the case in which a presumption of an accident is subsequently rated as correct;
 the third exemplary embodiment is a third sequence of the method, which is typical of the case in which a presumption of an accident is immediately rated as correct.

In accordance with a first exemplary embodiment, a first sequence of the method is described, which is typical of the case in which a presumption of an accident is incorrect. For the method according to one example for detecting and rating an accident involving a vehicle, which is in the form of an automobile, for example, there is a mobile device located in an interior, e.g. in a passenger compartment, of the vehicle. The mobile device is e.g. a mobile phone of the driver that is in a briefcase of the driver, which has been put behind the driver's seat. The mobile device comprises e.g. a first sensor, which is formed by an acceleration sensor of the mobile phone, and a second sensor, which is formed by a microphone of the mobile phone, and a third sensor, which is formed by a velocity sensor of the mobile phone. An accident monitoring system is operated as an application on the mobile device. The application continually captures sensor data of the first sensor and of the second sensor and of the third sensor and temporarily stores said data in a memory of the mobile device in the manner of a shift register. The acceleration sensor senses accelerations and the microphone picks up in particular low-frequency sounds, such as occur in the event of a collision between a vehicle and another vehicle or in the event of a collision with a stationary obstacle, e.g. a tree, and the velocity sensor senses the current velocity.

In the first exemplary case, the sensor data of the acceleration sensor of the mobile device now exceed a stipulated threshold value for the acceleration, because the driver's briefcase, together with the mobile device accommodated therein, is hurled to the right, as seen in the direction of travel, behind the passenger's seat on a quickly taken left-hand curve and overturns in the process.

The threshold values are stored in the application. According to a variant embodiment, there is provision for these threshold values to be able to be matched to the type of vehicle, e.g. four-wheeled vehicle or two-wheeled vehicle, automatically or by means of a selection menu. As soon as at least one of the sensors exceeds the respective associated threshold value with one of its sensor values—as is true of the acceleration sensor in the first exemplary case—the application initiates the steps cited below:
 the sensor data currently stored in the memory of the mobile device remain stored and are not erased or pushed out of the shift register;
 an accident verification routine is launched, which comprises the steps cited below:
  the accident verification routine evaluates the stored sensor data in such a way that a tiered significance level (severity level) is ascertained, wherein in the first exemplary case the maximum acceleration sensed by the first sensor does not lead to the highest significance level 6 of 6 in the evaluation, but rather only an average significance level 3 of 6 is reached, and wherein in the first exemplary case the low-frequency sounds detected by the second sensor lead to an irrelevant significance level 0 of 6 in the evaluation;
  the accident verification routine evaluates the sensor data captured from the timestamp onwards in a time interval of predetermined length in such a way that a tiered credibility level (confidence level) is repeatedly ascertained on the basis of said data; the credibility level in the first exemplary case is therefore ascertained on the basis of the sensor data that the first and the second sensor provide after the timestamp is set, and
  the accident verification routine repeatedly uses the significance level (severity level) and/or the currently ascertained credibility level (confidence level) in the time interval to decide, with regard to the automatic sending of an accident report,
   either that an accident report is sent or
   that no accident report is sent and the accident verification routine is executed again or
   that the accident verification routine is terminated.

In the first exemplary case, the first sensor has triggered the launch of the accident verification routine, the triggering sensor value not being at significance level 6 of 6, but rather being only 3 of 6, with the result that an accident report is not sent immediately, and the credibility level, owing to the further comparatively low sensor values—briefcase again still lying down—, also moving to an increasingly lower credibility level with every fresh calculation, since the briefcase with the mobile device located therein again moves uniformly with the vehicle, which, in the first exemplary case, is traveling on a straight section at a constant velocity of 70 km/h. Ultimately, the fallen credibility level and the only average significance level before the time interval has elapsed lead to termination of the accident verification routine. This means that no accident report is sent and of course no accident warning is output either.

In accordance with a second exemplary embodiment, a second sequence of the method is described, which is typical of the case in which a presumption of an accident is correct. For the method according to one example for detecting and rating an accident involving a vehicle, which is in the form of an automobile, for example, there is a mobile device located in a passenger compartment of the vehicle. The mobile device is e.g. a mobile phone of the driver that is in a briefcase of the driver, which has been put behind the driver's seat. The mobile device comprises e.g. a first sensor, which is formed by an acceleration sensor of the mobile phone, and a second sensor, which is formed by a microphone of the mobile phone, and a third sensor, which is formed by a velocity sensor of the mobile phone. An accident monitoring system is operated as an application on the mobile device. The application continually captures sensor data of the first sensor and of the second sensor and of the third sensor and temporarily stores said data in a memory of the mobile device in the manner of a shift register. The acceleration sensor senses in particular accelerations and the microphone picks up in particular low-frequency sounds, such as occur in the event of a collision between a vehicle and another vehicle or in the event of a collision with a stationary obstacle, e.g. a tree.

In the second exemplary case, the sensor data of the acceleration sensor of the mobile device now exceed a stipulated threshold value for the acceleration, because the driver's briefcase, together with the mobile device accommodated therein, is hurled to the right, as seen in the direction of travel, behind the passenger's seat and overturns in the process. In this instance, this has been triggered by the driver having taken a left-hand curve too quickly on a slippery road and the vehicle having slid laterally from the curve onto a downhill meadow and having come to a standstill 50 m away from the road.

In respect of the threshold values and in respect of the steps triggered as a result of at least one of the threshold values being exceeded, explicit reference is made to the explanations pertaining to the first exemplary embodiment.

In the second exemplary case, the acceleration sensed by the first sensor does not lead to the highest significance level 6 of 6 in the evaluation, but rather reaches only an average significance level 4 of 6, and the low-frequency sounds detected by the second sensor lead only to an irrelevant significance level 0 of 6 in the evaluation. This also applies to the values of the velocity sensor.

The credibility level is ascertained in the second exemplary case on the basis of the sensor data that the first sensor, the second sensor, the third sensor and a fourth sensor, which is in the form of a GPS sensor, deliver after the timestamp is set.

In the second exemplary case, the first sensor has triggered the launch of the accident verification routine, the triggering sensor value not being at significance level 6 of 6, with the result that an accident report is not sent immediately, and the credibility level continuing to be comparatively low when the vehicle coasts to a stop and the vehicle is at a standstill, since when it is coasting to a stop over the meadow the unevennesses that are present there result in the acceleration sensor capturing acceleration values that are below the threshold values stored for accelerations and lead only to a significance level 2 of 6 when the credibility level is calculated. On the basis of the sensor data of the fourth sensor, however, the comparison with a digital road map available on the mobile device can then detect that the mobile device is initially situated 50 m away from a sealed road and is then being moved in an area that is within a radius of 10 m around the last location. Since this indicates that the mobile device has been removed from the vehicle and is being moved around the vehicle, this ultimately leads to a credibility level 5 of 6 in the evaluation, which credibility level, together with the significance level 3 of 6, leads to an accident report being sent within the time interval and an accident warning being transmitted.

In accordance with a third exemplary embodiment, a third sequence of the method is described, which is typical of the case in which a presumption of an accident is correct and a serious accident has occurred. For the method according to one example for detecting and rating an accident involving a vehicle, which is in the form of an automobile, for example, there is a mobile device located in a passenger compartment of the vehicle. The mobile device is e.g. a mobile phone of the driver that is in a briefcase of the driver, which has been stowed in a trunk of the vehicle. The mobile device comprises e.g. a first sensor, which is formed by an acceleration sensor of the mobile phone, and a second sensor, which is formed by a microphone of the mobile phone, and a third sensor, which is in the form of a velocity sensor of the mobile phone. An accident monitoring system is operated as an application on the mobile device. The application continually captures sensor data of the first sensor and of the second sensor and of the third sensor and temporarily stores said data in a memory of the mobile device in the manner of a shift register. The acceleration sensor senses accelerations and the microphone picks up in particular low-frequency sounds, such as occur in the event of a collision between a vehicle and another vehicle or in the event of a collision with a stationary obstacle, e.g. a tree.

In the third exemplary case, the sensor data of the acceleration sensor of the mobile device now exceed a stipulated threshold value for the acceleration, because the driver's briefcase, together with the mobile device accommodated therein, undergoes an extremely high deceleration in the trunk as seen in the direction of travel. This is caused by a frontal impact by the vehicle against a tree.

In respect of the threshold values and in respect of the steps triggered as a result of at least one of the threshold values having been exceeded, explicit reference is made to the explanations pertaining to the first exemplary embodiment.

In the third exemplary case, the acceleration sensed by the first sensor leads to the highest significance level 6 of 6 in the evaluation and the low-frequency sounds detected by the second sensor lead to a significance level 5 of 6 in the evaluation. The abrupt change of velocity sensed by the third sensor also leads to a significance level 6 of 6 in the evaluation.

In the third exemplary case, the first pass of the loop results in an accident report being sent immediately, since the significance level is sufficiently high for it not to be necessary to ascertain the credibility level, and a rapid accident report and a rapid accident warning take priority.

It is true of all of the exemplary embodiments that the accident monitoring system can evaluate sensor data from further sensors of the mobile device. In this instance, the accident monitoring system is programmed flexibly enough for it to be able to work with different groups of sensors, depending on the sensors that are available from the mobile device.

Furthermore, there is also provision for event data to be evaluated in addition, with the result that a low credibility level can be derived for example from the circumstance that a passenger is playing a computer game in the time interval after the timestamp is set or it is established that the passenger was playing the computer game without interruption before the timestamp was set, during the timestamp and after the timestamp was set.

Figure 1:
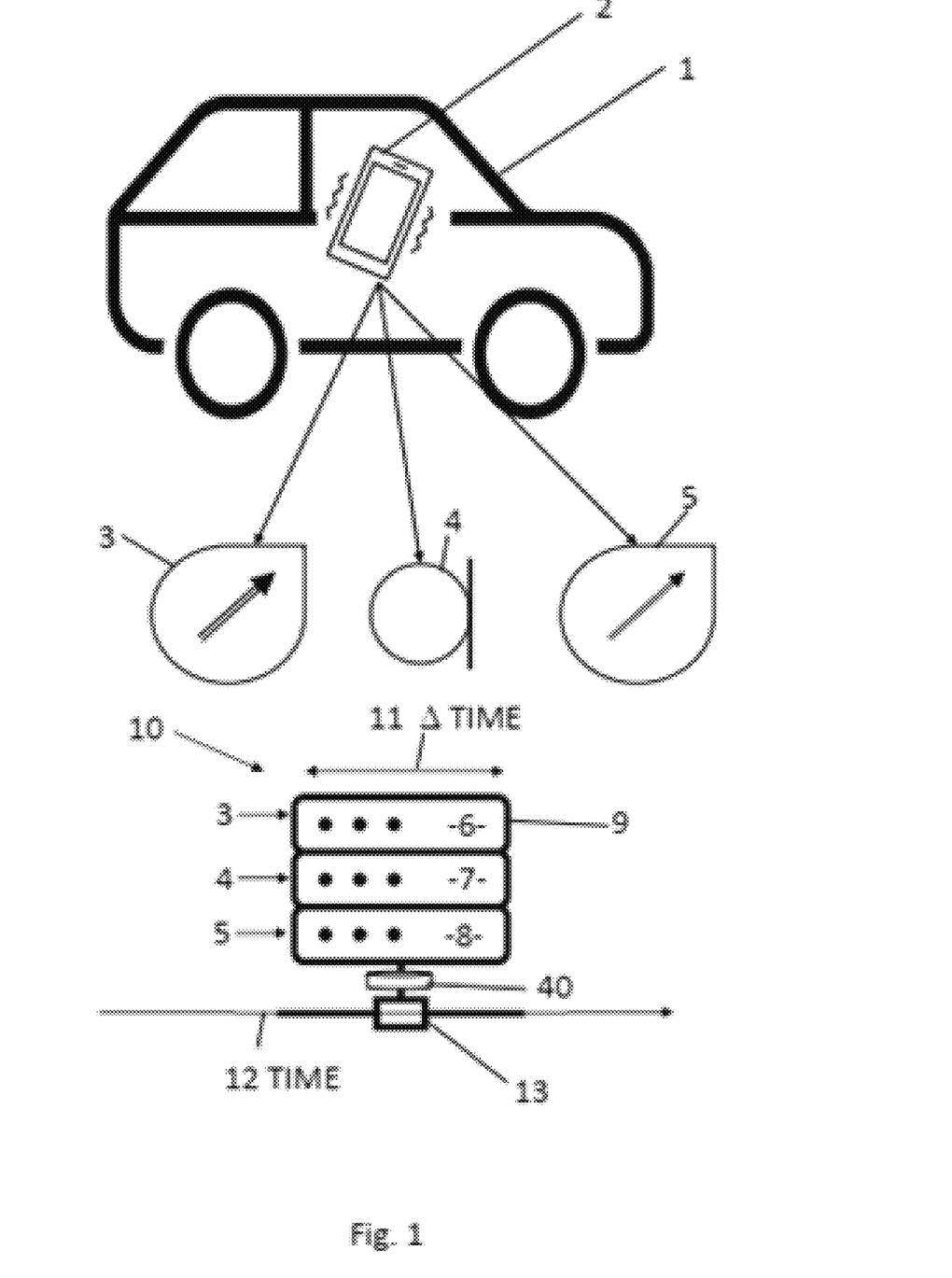
FIG. 1 shows a vehicle carrying a mobile device, in one example.
Figure 2:
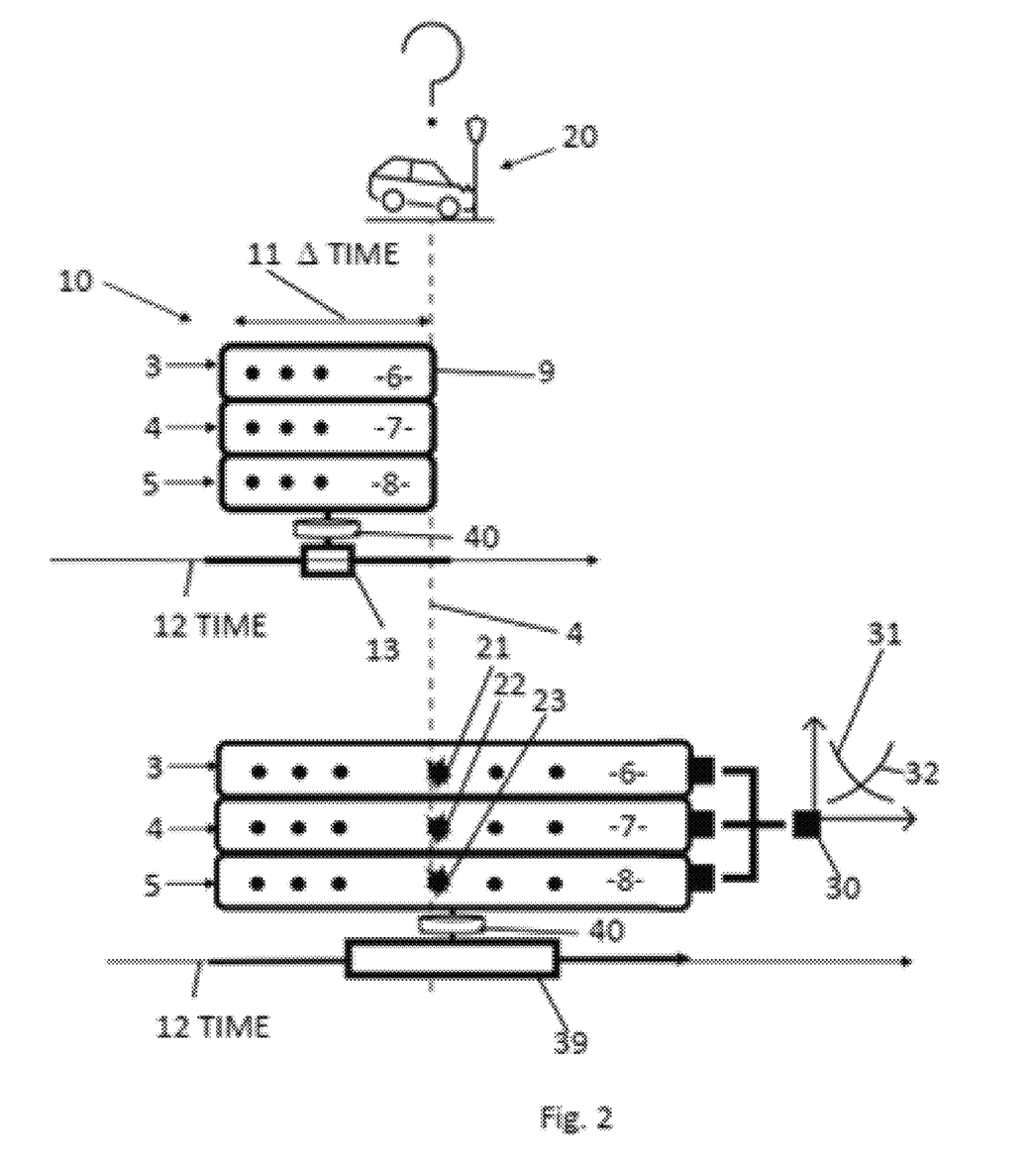
FIG. 2 shows a shift register, in one example.
Figure 3:
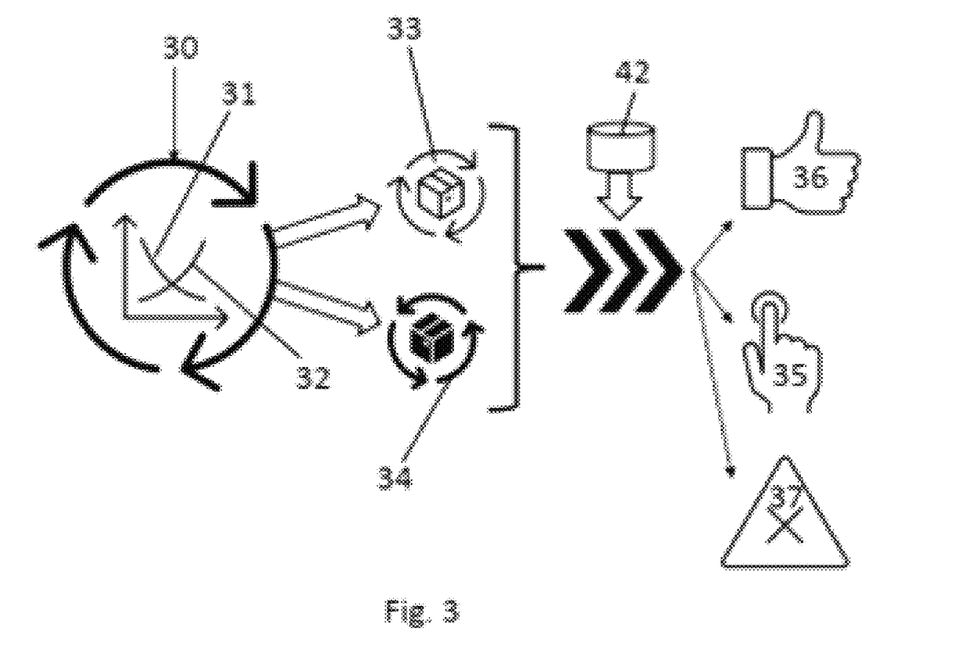
FIG. 3 shows an accident verification routine, in one example.

Referring to an embodiment introduced in FIGS. 1 to 3, the method according to one example is furthermore explained.

FIG. 1 shows a vehicle 1 carrying a mobile device 2, the method steps being executed on the mobile device 2. The mobile device 2 is equipped with at least three sensors 3, 4, and 5. The sensor 3 is a velocity sensor, sensor 4 is a microphone and sensor 5 is an acceleration sensor. Also other sensors like navigation sensors are possible.

The accident monitoring system is operated on the mobile device 2 in such a way that the mobile device 2 continually captures sensor data 6, from sensor 3, sensor data 7 from sensor 4 and sensor data 8 from sensor 5. The sensor data 6, 7 and 8 is temporarily stored over a time window 11 in a memory 9 in the manner of a shift register 10. The time windows 11 and accordingly the time dependent storage of the shift register 10 moves along the time axis 12 as a dataset 13 in time. The present disclosure is not limited to three sensors but can use the sensor data and shift register dataset of any kind and amount of sensors provided by the mobile device 2.

FIG. 2 shows the shift register 10 according to FIG. 1 with the data 6, 7 and 8 from the sensors 3, 4 and 5. When a potential accident 20 occurs, the sensor data 6, 7 or 8 of at least one of the sensors have exceeded a threshold value. This is depicted by symbols 21, 22 and 23 for each data stream of sensor data 6, 7 and 8 stipulated for the respective sensor. Threshold values do not have to be exceeded on all sensors or in the same dimension. Also single peaks or events can be sufficient to initiate the further steps of the method. When threshold value 21 and/or 22 and/or is exceeded, a timestamp is set in the memory 9 of the shift register 10, and the available sensor data 6, 7 and 8 remain stored. A continuous enlargement 39 of the stored data is provided in order to allow the sensor data 6, 7 and 8 to be continuously used.

An accident verification routine 30 as also shown in FIG. 3 is launched on the mobile device 2, wherein the accident verification routine 30 evaluates the stored sensor data in such a way that a tiered significance level 31 (severity level) is ascertained. The accident verification routine 30 also evaluates the sensor data captured from the timestamp onwards in a time interval of predetermined length in such a way that a tiered credibility level 32 (confidence level) is repeatedly ascertained. These being continuously calculated in the routine 30 the accident verification routine 30 uses the significance level 31 (severity level) and/or the currently ascertained credibility level 32 (confidence level) repeatedly 33 for the significance level 31 and repeatedly 34 for the creditability level 32 in the time interval from the timestamp to the time of verification to decide
    either that an accident report 35 is sent or
    that no accident report 36 is sent and the accident verification routine is executed again or
    that the accident verification routine is terminated 37.

As mentioned the report 35 can be transmitted by the same mobile device 2 as that on which the method is also executed.

It is a possible embodiment that the verification routine 30 for evaluation also comprises a comparison of the sensor data and/or the event data 40 with comparison data, wherein the comparison data used are statistical data that in particular have been ascertained on the basis of analyzed and verified accidents and/or wherein the comparison data used are geodata derived from a map that are taken as a basis for rating a position or direction of movement of the mobile device 2.

It should also be noted that the different examples described herein can be combined in different ways. That is, parts of one or more examples can be combined with parts of one or more other examples. All of this is contemplated herein.

Example 1 is a method for detecting and rating an accident involving a vehicle, the method steps being executed on a mobile device equipped with at least two sensors that is carried by the vehicle. A accident monitoring system is operated on the mobile device in such a way that the mobile device continually captures sensor data of at least two of its sensors and temporarily stores said data in a memory in the manner of a shift register and that, after the sensor data of at least one of the sensors have exceeded a threshold value stipulated for the respective sensor, a timestamp is set in the memory, the available sensor data remain stored and an accident verification routine is launched on the mobile device. The accident verification routine both evaluates the stored sensor data in such a way that a tiered significance level (severity level) is ascertained and evaluates the sensor data captured from the timestamp onwards in a time interval of predetermined length in such a way that a tiered credibility level (confidence level) is repeatedly ascertained, that the significance level (severity level) and/or the currently ascertained credibility level (confidence level) are repeatedly used in the time interval to decide either that an accident report is sent or that no accident report is sent and the accident verification routine is executed again or that the accident verification routine is terminated.

Example 2 is the method of any or all previous examples, wherein the accident report is transmitted by the same mobile device as that on which the method is also executed.

Example 3 is the method of any or all previous examples, wherein the mobile device captures and evaluates movement data and/or position data as sensor data in the time interval, this being performed in particular by means of a motion sensor of the mobile device and/or an acceleration sensor of the mobile device and/or a navigation sensor of the mobile device.

Example 4 is the method of any or all previous examples, wherein the credibility level (confidence level) is ascertained by using captured event data in addition to the captured sensor data.

Example 5 is the method of any or all previous examples, wherein the accident verification routine also verifies whether or not the measured velocity of the mobile device decreases, wherein if the velocity measured by the mobile device decreases to a value that in particular is below approximately 10 km/h and preferably is 0 km/h, the significance level (severity level) is set to a high value, which is indicative of an accident having occurred.

Example 6 is the method of any or all previous examples, wherein the evaluation also comprises a comparison of the sensor data and/or the event data with comparison data, wherein the comparison data used are statistical data that in particular have been ascertained on the basis of analyzed and verified accidents and/or wherein the comparison data used are geodata derived from a map that are taken as a basis for rating a position or direction of movement of the mobile device.

Example 7 is the method of any or all previous examples, wherein the accident verification routine uses comparison data to also verify whether the measured velocity of the mobile device increases to a value that is plausible for the movement of an undamaged vehicle, such an increase resulting in the credibility level (confidence level) being set to a low reference value.

Example 8 is the method of any or all previous examples, wherein the sensor data captured are 3D movement data and/or acceleration data, which preferably have a unique association with the movement in space.

Example 9 is the method of any or all previous examples, wherein an accident warning is transmitted after the accident report is sent, wherein the accident warning comprises at least one of the pieces of information cited below: a timestamp, geocoordinates of an accident location, a timestamp for the accident, a velocity measured by the navigation system.

Example 10 is the method of any or all previous examples, wherein the timestamp and the sensor data are used to generate the information mentioned in the accident warning.

Example 11 is the method of any or all previous examples, wherein ascertainment of the significance level (severity level) is started after a time delay following the launch of the accident verification routine and the ascertainment of the significance level (severity level) results in a trend in the velocity since the timestamp was set being taken into consideration to the effect that an increased significance level (severity level) is stipulated in the event of a deceleration to a velocity below a limit value or in the event of a standstill and a decreased significance level (severity level) is stipulated in the event of the absence of a deceleration.

Example 12 is the method of any or all previous examples, wherein the credibility level (confidence level) is ascertained from the sensor data and the event data by also drawing conclusions about a behavior relating to a driver or passenger handling the mobile device and by evaluating the detected behavior in such a way that the credibility level (confidence level) is increased by a behavior that is typical of an accident and that the credibility level (confidence level) is reduced by a behavior that is untypical of an accident.

Example 13 is the method of any or all previous examples, wherein an accident report is sent whenever the significance level (severity level) has reached its highest reference value and an accident report is also sent whenever both the significance level (severity level) and the credibility level (confidence level) have reached predefined reference values.

Example 14 is the method of any or all previous examples, wherein no accident report is sent and the accident verification routine is executed again if the significance level (severity level) and the credibility level (confidence level) are at reference values that are neither provided for sending an accident report nor provided for terminating the accident verification routine.

Example 15 is the method of any or all previous examples, wherein the accident verification routine is terminated either if the time interval has expired or if the significance level (severity level) and/or the credibility level (confidence level) are so low that an accident can be ruled out.

It will be noted that the above discussion has described a variety of different systems, components, logic, modules, generators, and/or interactions. It will be appreciated that any or all of such systems, components, logic, modules, generators, and/or interactions may be implemented by hardware items, such as one or more processors, one or more servers, one or more processors executing computer executable instructions stored in memory, memory, or other processing components, some of which are described below, that perform the functions associated with those systems, components, logic, modules, generators, and/or interactions. In addition, any or all of the systems, components, logic, modules, generators, and/or interactions may be implemented by software that is loaded into a memory and is subsequently executed by one or more processors or servers or other computing component(s), as described below. Any or all of the systems, components, logic, modules, generators, and/or interactions may also be implemented by different combinations of hardware, software, firmware, etc., some examples of which are described below. These are some examples of different structures that may be used to implement any or all of the systems, components, logic, modules, generators, and/or interactions described above. Other structures may be used as well.

It will also be noted that the elements of FIGS. 1-3, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

Figure 4:
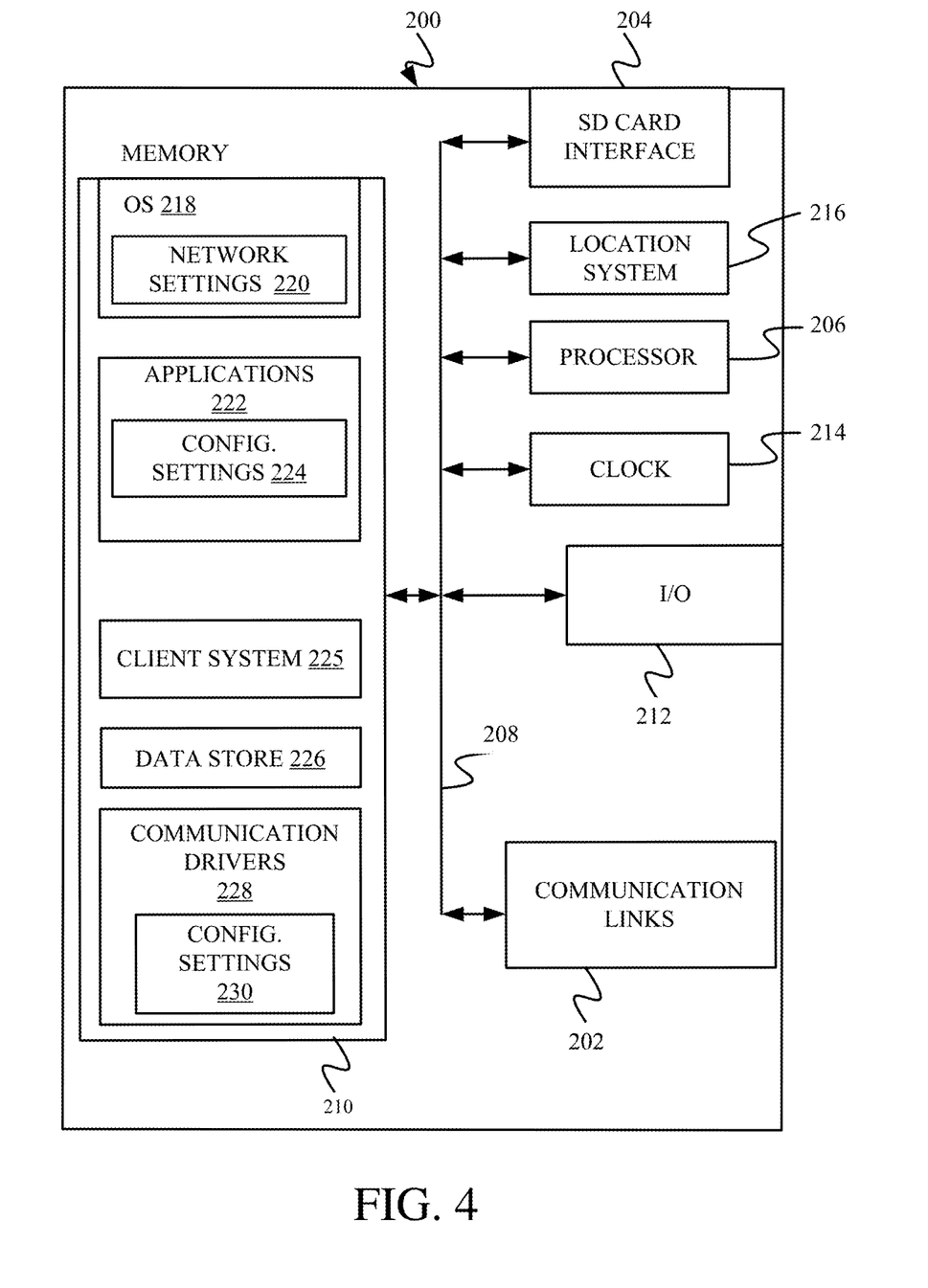
FIG. 4 is a simplified block diagram of one example of a handheld or mobile computing device.
Figure 5:
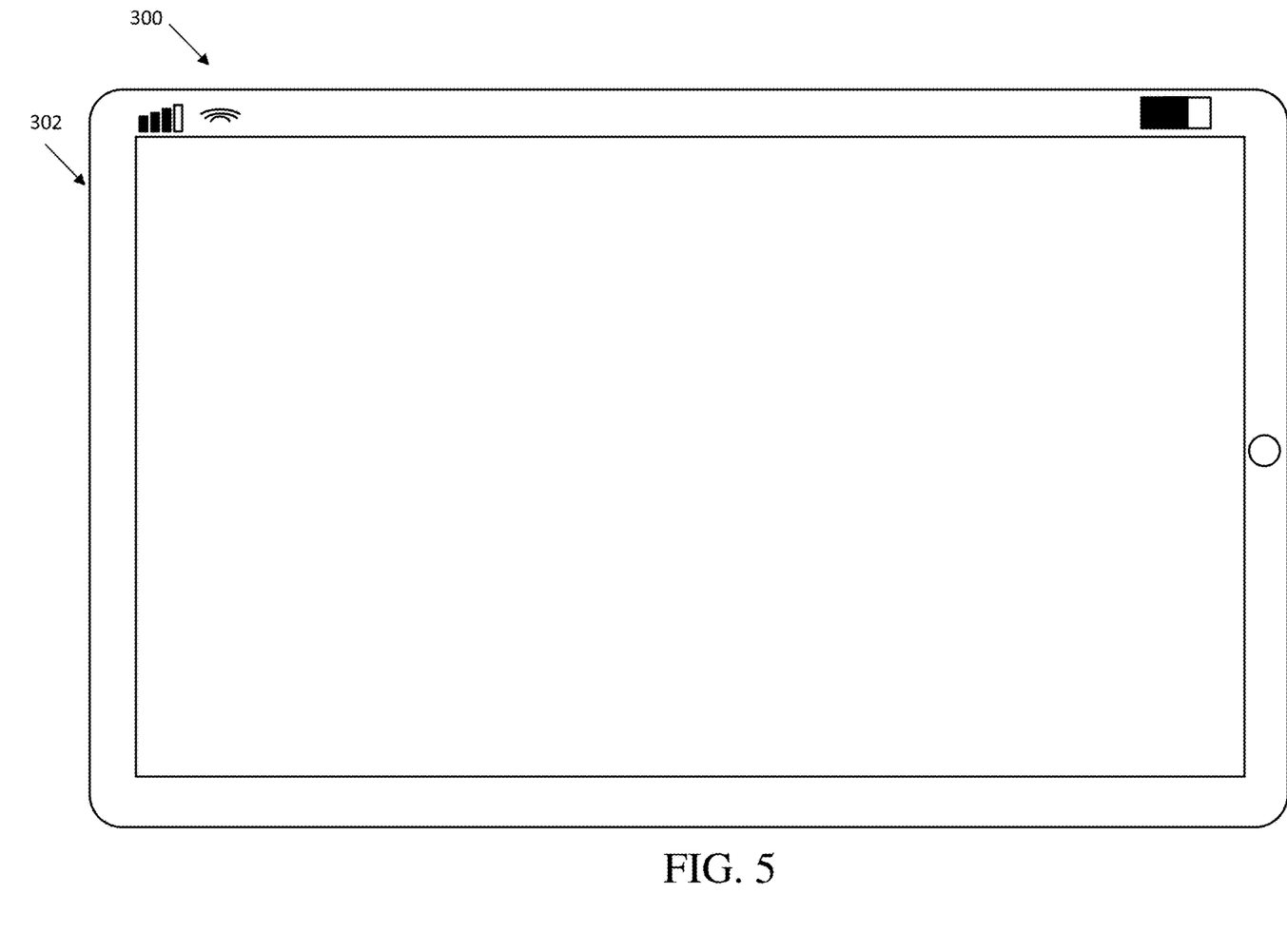
FIGS. 5 and 6 show examples of mobile devices.
Figure 6:
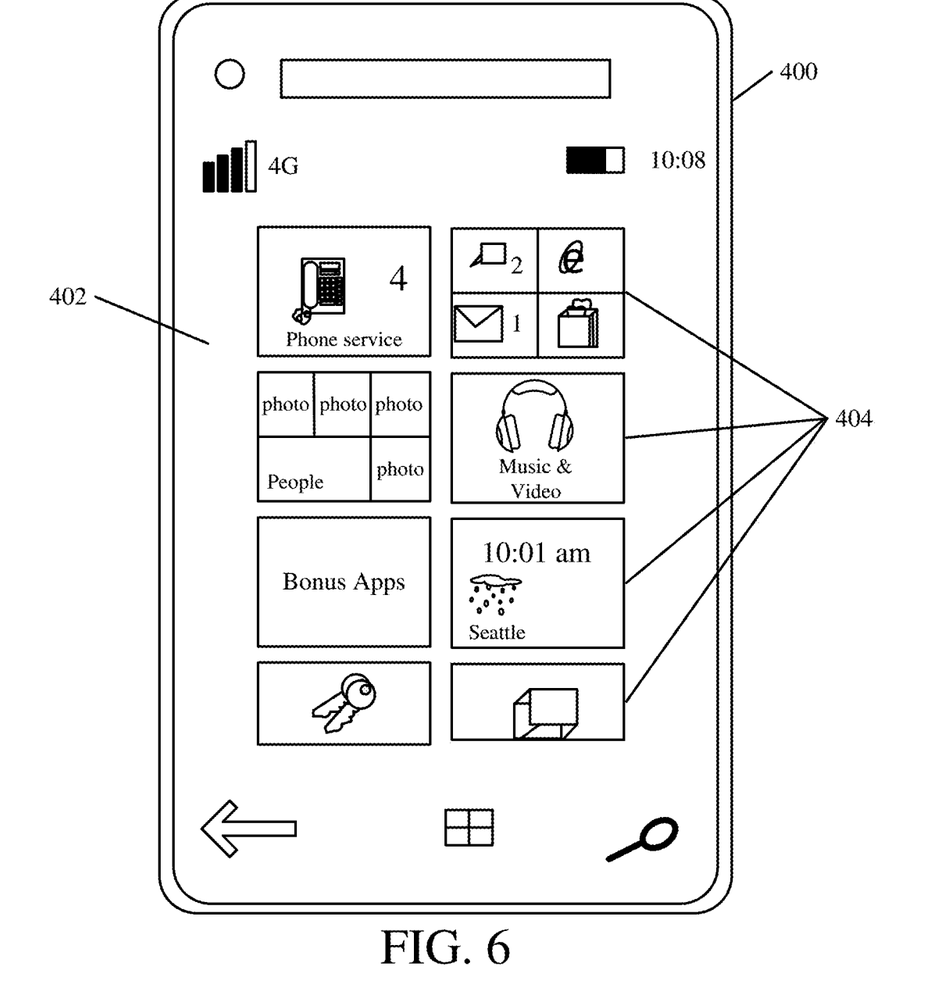

FIG. 4 is a simplified block diagram of one illustrative example of a handheld or mobile computing device that can be used as a user's or client's handheld device 200, in which the present system (or parts of it) can be deployed. FIGS. 5-6 are examples of handheld or mobile devices.

Client device 200 can run some components shown in FIGS. 1-3, interact with them, or both. In the device 200, a communications link 202 is provided that allows the handheld device to communicate with other computing devices and under some examples provides a channel for receiving information automatically, such as by scanning. Examples of communications link 202 include allowing communication though one or more communication protocols, such as wireless services used to provide cellular access to a network, as well as protocols that provide local wireless connections to networks.

In other examples, applications can be received on a removable Secure Digital (SD) card that is connected to an interface 204. Interface 204 and communication links 202 communicate with a processor 206 (which can also embody processors or servers from other FIGS.) along a bus 208 that is also connected to memory 210 and input/output (I/O) components 212, as well as clock 214 and location system 216.

I/O components 212, in one example, are provided to facilitate input and output operations. I/O components 212 for various examples of the device 200 can include input components such as buttons, touch sensors, optical sensors, microphones, touch screens, proximity sensors, accelerometers, orientation sensors and output components such as a display device, a speaker, and or a printer port. Other I/O components 212 can be used as well.

Clock 214 illustratively comprises a real time clock component that outputs a time and date. It can also, illustratively, provide timing functions for processor 206.

Location system 216 illustratively includes a component that outputs a current geographical location of device 200. This can include, for instance, a global positioning system (GPS) receiver, a LORAN system, a dead reckoning system, a cellular triangulation system, or other positioning system. Location system 216 can also include, for example, mapping software or navigation software that generates desired maps, navigation routes and other geographic functions.

Memory 210 stores operating system 218, network settings 220, applications 222, application configuration settings 224, a client system 225, data store 226, communication drivers 228, and communication configuration settings 230. Memory 210 can include all types of tangible volatile and non-volatile computer-readable memory devices. Memory 210 may also include computer storage media (described below). Memory 210 stores computer readable instructions that, when executed by processor 206, cause the processor to perform computer-implemented steps or functions according to the instructions. Processor 206 may be activated by other components to facilitate their functionality as well.

FIG. 5 shows one example in which device 200 is a tablet computer 300. In FIG. 5, computer 300 is shown with user interface display screen 302. Screen 302 can be a touch screen or a pen-enabled interface that receives inputs from a pen or stylus. Tablet computer 300 may also use an on-screen virtual keyboard. Of course, computer 300 might also be attached to a keyboard or other user input device through a suitable attachment mechanism, such as a wireless link or USB port, for instance. Computer 300 may also illustratively receive voice inputs as well.

FIG. 6 is similar to FIG. 5 except that the device is a smart phone 400. Smart phone 400 has a touch sensitive display 402 that displays icons or tiles or other user input mechanisms 404. Mechanisms 404 can be used by a user to run applications, make calls, perform data transfer operations, etc. In general, smart phone 400 is built on a mobile operating system and offers more advanced computing capability and connectivity than a feature phone.

Note that other forms of the devices 200 are possible.

Figure 7:
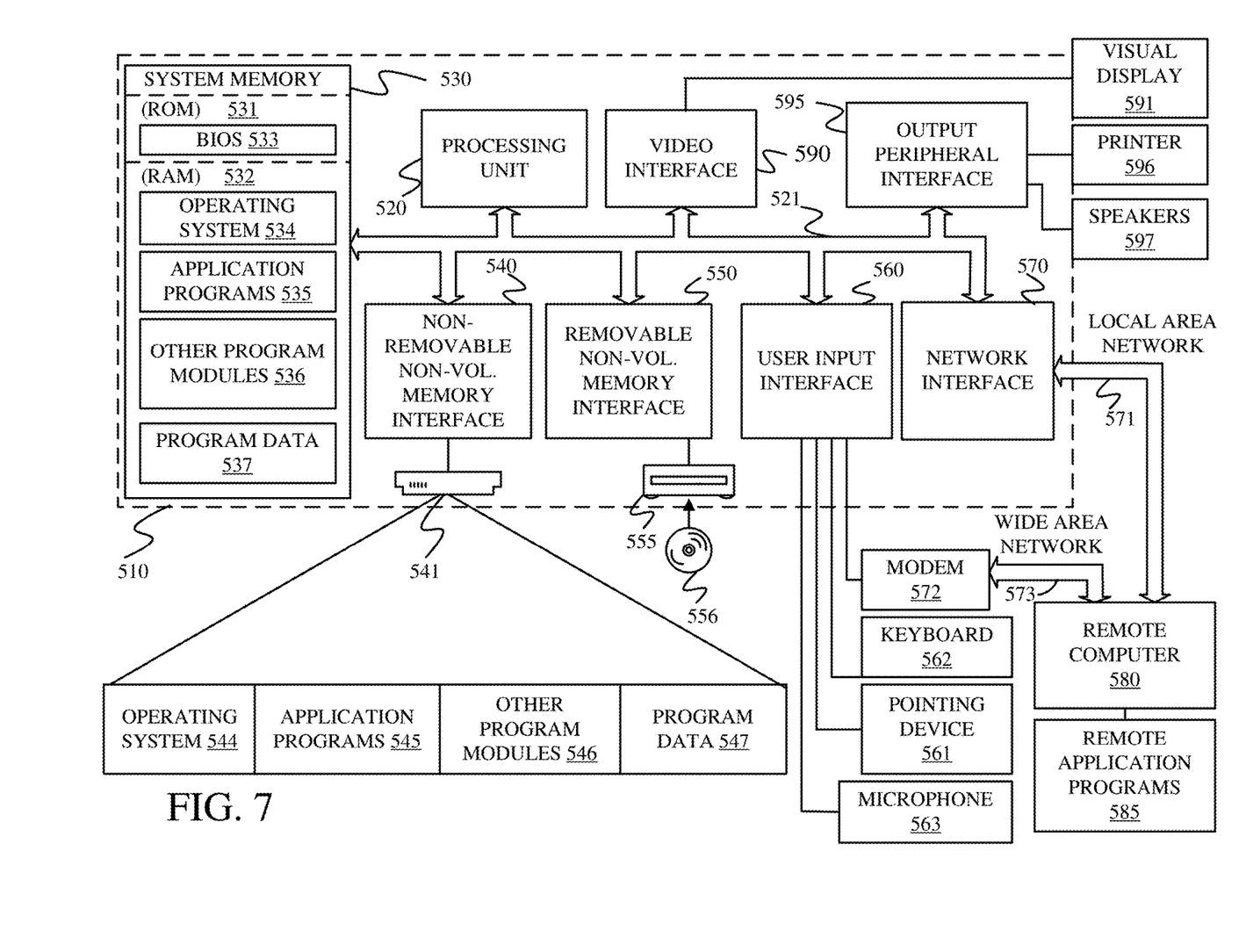
FIG. 7 is a block diagram showing one example of a computing environment.

FIG. 7 is one example of a computing environment in which elements of previous figures described herein can be deployed. With reference to FIG. 7, an example system for implementing some embodiments includes a computing device in the form of a computer 510 programmed to operate as discussed above. Components of computer 510 may include, but are not limited to, a processing unit 520 (which can comprise processors or servers from previous FIGS.), a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. Memory and programs described with respect to previous figures described herein can be deployed in corresponding portions of FIG. 7.

Computer 510 typically includes a variety of computer readable media. Computer readable media may be any available media that can be accessed by computer 510 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 530 includes computer storage media in the form of volatile and/or nonvolatile memory or both such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data or program modules or both that are immediately accessible to and/or presently being operated on by processing unit 520. By way of example, and not limitation, FIG. 7 illustrates operating system 534, application programs 535, other program modules 536, and program data 537.

The computer 510 may also include other removable/non-removable volatile/nonvolatile computer storage media. By way of example only, FIG. 7 illustrates a hard disk drive 541 that reads from or writes to non-removable, nonvolatile magnetic media, an optical disk drive 555, and nonvolatile optical disk 556. The hard disk drive 541 is typically connected to the system bus 521 through a non-removable memory interface such as interface 540, and optical disk drive 555 are typically connected to the system bus 521 by a removable memory interface, such as interface 550.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 510. In FIG. 7, for example, hard disk drive 541 is illustrated as storing operating system 544, application programs 545, other program modules 546, and program data 547. Note that these components can either be the same as or different from operating system 534, application programs 535, other program modules 536, and program data 537.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures. A visual display 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections (such as a controller area network-CAN, local area network-LAN, or wide area network WAN) to one or more remote computers, such as a remote computer 580.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. In a networked environment, program modules may be stored in a remote memory storage device. FIG. 7 illustrates, for example, that remote application programs 585 can reside on remote computer 580.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It should also be noted that the different examples described herein can be combined in different ways. That is, parts of one or more examples can be combined with parts of one or more other examples. All of this is contemplated herein.

Although the present invention has been described with reference to preferred embodiments, workers skilled in the art will recognize that changes may be made in form and detail without departing from the spirit and scope of the invention.

What is claimed is:

1. A method, executed on a mobile device equipped with a plurality of sensors that is carried by a vehicle, for detecting and rating an accident involving the vehicle, the method comprising:
   operating an accident monitoring system on the mobile device such that
      the mobile device continually captures sensor data of at least two sensors, of the plurality of sensors, and temporarily stores said sensor data in a memory in a shift register, and
      after the sensor data of at least one sensor have exceeded a threshold value stipulated for the respective sensor,
         a timestamp is set in the memory,
         the sensor data remain stored, and
         an accident verification routine is launched on the mobile device,
   evaluating, by the accident verification routine,
      the sensor data such that a tiered significance level is ascertained, and
      the sensor data captured from the timestamp onwards in a time interval of predetermined length such that a tiered credibility level is repeatedly ascertained, wherein
         the tiered significance level and/or the tiered credibility level are repeatedly used in the time interval to decide that at least one of:
            an accident report is sent,
            no accident report is sent and the accident verification routine is executed again, or
            the accident verification routine is terminated.

2. The method of claim 1, wherein the accident report is transmitted by the mobile device.

3. The method of claim 1, and comprising:
   capturing and evaluating movement data and/or position data as sensor data in the time interval using one or more of:
      a motion sensor of the mobile device,
      an acceleration sensor of the mobile device, or
      a navigation sensor of the mobile device.

4. The method of claim 1, wherein the tiered credibility level is ascertained by using captured event data in addition to the captured sensor data.

5. The method of claim 1, wherein the accident verification routine also verifies whether or not a measured velocity of the mobile device decreases, wherein if the measured velocity of the mobile device decreases to a value that is below approximately 10 km/h, the tiered significance level is set to a high value, which is indicative of an accident having occurred.

6. The method of claim 1, wherein the accident verification routine also verifies whether or not a measured velocity of the mobile device decreases, wherein if the measured velocity of the mobile device decreases to 0 km/h, the tiered significance level is set to a high value, which is indicative of an accident having occurred.

7. The method of claim 1, wherein the evaluation also comprises a comparison of the sensor data and/or event data with comparison data, wherein the comparison data used are statistical data that have been ascertained on the basis of analyzed and verified accidents and/or wherein the comparison data used are geodata derived from a map that are taken as a basis for rating a position or direction of movement of the mobile device.

8. The method of claim 1, wherein the accident verification routine uses comparison data to also verify whether a measured velocity of the mobile device increases to a value that is plausible for the movement of an undamaged vehicle, such an increase resulting in the tiered credibility level being set to a low reference value.

9. The method of claim 1, wherein the sensor data captured are 3D movement data and/or acceleration data.

10. The method of claim 9, wherein the 3D movement data and/or acceleration data have a unique association with the movement in space.

11. The method of claim 1, and comprising transmitting an accident warning after the accident report is sent, wherein the accident warning comprises at least one of:
- a timestamp,
- geocoordinates of an accident location,
- a timestamp for the accident, or
- a velocity measured by a navigation system.

12. The method of claim 11, wherein the timestamp and the sensor data are used to generate information mentioned in the accident warning.

13. The method of claim 1, wherein ascertainment of the tiered significance level is started after a time delay following the launch of the accident verification routine and the ascertainment of the tiered significance level results in a trend in a velocity since the timestamp was set being taken into consideration to the effect that an increased significance level is stipulated in the event of a deceleration to a velocity below a limit value or in the event of a standstill and a decreased significance level is stipulated in the event of the absence of a deceleration.

14. The method of claim 1, wherein the tiered credibility level is ascertained from the sensor data and the event data based on a behavior relating to a driver or passenger handling the mobile device and by evaluating the behavior such that the tiered credibility level is increased by a behavior that is typical of an accident and that the tiered credibility level is reduced by a behavior that is untypical of an accident.

15. The method of claim 1, wherein an accident report is sent whenever the tiered significance level has reached its highest reference value and in that an accident report is also sent whenever both the tiered significance level and the tiered credibility level have reached predefined reference values.

16. The method of claim 1, wherein no accident report is sent and the accident verification routine is executed again if the tiered significance level and the tiered credibility level are at reference values that are neither provided for sending an accident report nor provided for terminating the accident verification routine.

17. The method of claim 1, wherein the accident verification routine is terminated either if the time interval has expired or if the tiered significance level and/or the tiered credibility level are so low that an accident can be ruled out.

18. The method of claim 1, wherein the tiered significance level comprises a severity level.

19. The method of claim 1, wherein the tiered credibility level comprises a confidence level.

* * * * *